United States Patent Office 2,996,530
Patented Aug. 15, 1961

2,996,530
PHOSPHINYL ALICYCLIC SILICON COMPOUNDS
Frank Fekete, Verona, Pa., assignor to Union Carbide Corporation, a corporation of New York
No Drawing. Filed Dec. 23, 1958, Ser. No. 782,376
6 Claims. (Cl. 260—448.8)

This invention relates in general to novel phosphorus-containing organosilicon compounds and to a process for their production. More particularly, this invention is concerned with phosphorus-containing organosilicon compounds wherein the phosphorus is bonded to the silicon atom through a divalent alicyclic hydrocarbon group having from 5 to 7 carbon atoms and to a process for producing them.

The compositions of the instant invention are organosilicon compounds containing at least one silicon-bonded group represented by the formula:

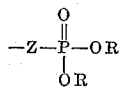

where R is a member selected from the class consisting of monovalent hydrocarbon radicals and monovalent halogenated hydrocarbon radicals and need not be the same throughout the same molecule and Z is a divalent alicyclic hydrocarbon radical containing from 5 to 7 carbon atoms, inclusive. The organosilicon compound is selected from the class consisting of organosilanes wherein at least one valence of silicon is satisfied by the

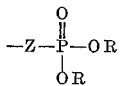

grouping and at least one valence is satisfied by a hydrocarbonoxy group, any remaining unfilled valences of silicon being satisfied by monovalent hydrocarbon radicals and halogenated monovalent hydrocarbon radicals and organosiloxanes having all its valences other than the valences satisfied by said

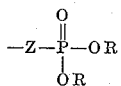

grouping and by siloxane linkages satisfied by monovalent hydrocarbon radicals and halogenated monovalent hydrocarbon radicals.

The compositions of the instant invention thus include phosphinyl alicyclic hydrocarbon silanes represented by the formula:

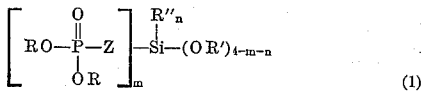
(1)

where R and Z are as above defined and R' represents a monovalent hydrocarbon radical and need not be the same throughout the same molecule, R" represents a monovalent hydrocarbon radical and need not be the same throughout the same molecule, $(m)$ is an integer of from 1 to 3, inclusive, and $(n)$ is an integer of from 0 to 2, inclusive, the sum of $m+n$ not exceeding 3. Examples of the monovalent hydrocarbon radicals that R' and R" represent are alkyl groups such as methyl, ethyl, propyl, butyl, heptadecyl and the like, cycloalkyl groups such as cyclopentyl, cyclohexyl and the like, aryl groups such as phenyl, tolyl, naphthyl and the like. R may represent in addition to the monovalent hydrocarbon radicals listed above for R' and R", halogenated monovalent hydrocarbon radicals such as halogenated aryl groups, for example, bromophenyl, chlorophenyl, chlorotolyl and the like; halogenated alkyl groups, for example, chloromethyl, chloroethyl, bromopropyl and the like; and halogenated cycloalkyl groups, for example, chlorocyclopentyl, bromocyclohexyl and the like. It is preferred that the monovalent hydrocarbon radicals that R, R' and R" represent, contain from 1 to 18 carbon atoms, since no commensurate advantages are gained by employing monovalent hydrocarbon radicals containing a greater number of carbon atoms. Examples of the divalent alicyclic hydrocarbon radical that Z represents are, cyclopentyl, cyclohexyl, cycloheptyl, bicycloheptyl and the like.

The phosphinyl alicyclic silanes of the instant invention have from 1 to 3 hydrocarbonoxy groups attached to the silicon atom, i.e., the silicon atom can be mono-, di- or trifunctional. Those having one hydrocarbonoxy group attached to the silicon are, for example, dimethoxyphosphinylcyclohexyldiphenylethoxysilane, diphenoxyphosphinylcycloheptyldimethylbutoxysilane and the like. Those having two hydrocarbonoxy groups attached to silicon are, for example, di-(2-ethylhexoxy)phosphinylcyclohexylmethyldimethoxysilane, dimethoxyphosphinylcycloheptylphenyldiethoxysilane and the like. Those having three hydrocarbonoxy groups attached to silicon are, for example, methoxyphenoxyphosphinylcyclohexyltriethoxysilane, dimethoxyphosphinylcycloheptyltriethoxysilane and the like.

My novel organosilicon compounds also include phosphinyl alicyclic hydrocarbon siloxanes containing at least one unit of the formula:

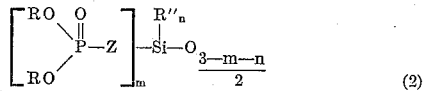
(2)

wherein, R, R", Z, $(m)$ and $(n)$ are as above defined. Also included in these phosphinyl alicyclic hydrocarbon siloxanes are phosphinyl alicyclic hydrocarbon siloxanes containing at least one unit depicted by Formula 2 with one or more units of the formula:

(3)

wherein R" is as above defined and $(x)$ is an integer of from 0 to 3, inclusive, and need not necessarily be the same throughout the molecule, but is the same in the same unit.

In accordance with my invention, the compositions thereof are prepared by the process comprising heating an ethylenically unsaturated alicyclic hydrocarbon silane (hereinafter referred to as ethylenically unsaturated alicyclic silanes) of the general formula:

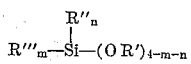

wherein R', R", $(m)$ and $(n)$ are as above defined and R''' is an ethylenically unsaturated alicyclic hydrocarbon group having from 5 to 7 carbon atoms, inclusive, such as cyclohexenyl, cycloheptenyl, bicycloheptenyl and the like, with an organophosphorus compound of the formula:

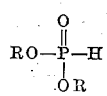

wherein R is as above defined, in the presence of a free radical addition catalyst, and maintaining the mixture at a temperature sufficiently elevated to cause said ethylenically unsaturated alicyclic silane and said organophosphorus compound to react to produce said phosphinyl alicyclic silanes. It is preferred to add a mixture of the ethylenically unsaturated alicyclic silane and the free radical addition catalyst to the organophosphorus compound which has been heated to a temperature sufficiently elevated to cause the formation of free radicals by the catalyst which causes the addition of the organophosphorus compound to the double bond of the ethylenically unsaturated alicyclic silane. Of course, the reactants can be added in the reverse manner, i.e., the phosphorus compound and catalyst can be mixed and added to the heated ethylenically unsaturated alicyclic silane, or both of the reactants and the catalyst can be mixed and then heated; however, by these latter methods, diminished yields of the product are obtained.

Mole ratios of the organophosphorus compound and ethylenically unsaturated alicyclic silane employed as starting materials in the process of this invention, are not critical. Stoichiometric amounts are preferred for efficient reaction and ease of product recovery. For example, one mole of the organophosphorus compound is preferred for each mole of ethylenic unsaturation to be reacted in the ethylenically unsaturated alicyclic silane. Other than stoichiometric amounts of the phosphorus compound and of the ethylenically unsaturated alicyclic silane can also be used, but no commensurate advantage is obtained thereby.

The free radical addition catalysts which are employed in the process of this invention include organic peroxides and azo compounds. Specific examples of organic peroxide catalysts operative herein include ditertiary butyl peroxide, dibenzoyl peroxide, diacetyl peroxide, dicumyl peroxide, tertiary butyl peracetate, tertiary butyl perbenzoate and the like. Specific examples of azo compounds operative herein include $\alpha,\alpha'$-azo diisobutyronitrile and 2,2'-dicyanoazobenzene. Without wishing to be bound by any one particular theory, it is believed that the reaction proceeds by a free radical mechanism, as the catalysts employed are known catalysts for reactions involving unsaturated organic compounds which proceed by a free radical mechanism. Thus, the catalysts useful in the process of this invention can be termed free radical addition catalysts. The concentration of catalyst is not critical and may vary from 0.5 to 10 percent by weight of the reactants, i.e., the ethylenically unsaturated alicyclic silane and organophosphorus compound. A catalyst concentration of 2–10 percent by weight based on the total amount of the reactants is preferred.

The temperatures at which the process of this invention is carried out can vary from 50° C. to 250° C. depending upon the rate of decomposition of the particular free radical addition catalyst used. The temperature must be sufficiently elevated to form free radicals from the catalyst and should be chosen so that the free radical formation does not take place with explosive violence. With the more active free radical addition catalysts such as, for example, dibenzoyl peroxide, tertiary butyl perbenzoate and the like, temperatures of from 50° C to 100° C. are preferred. Whereas when a less active free radical addition catalyst is used, for example, ditertiary butyl peroxide, temperatures of from 100° C. to 180° C. can be used. However, with the latter catalysts temperature range of from 120° C. to 160° C. is preferred.

The pressure at which the process of this invention is carried out is not critical. Pressures above or below atmospheric can be used if desired; however, it is preferred that the process be carried out at an atmospheric pressure. When one or more of the reactants is too volatile for practical reaction at atmospheric pressure, the reaction may conveniently be run in a pressure vessel.

A solvent is not necessary in the process of this invention, although a solvent may be employed if desired. The solvent employed should be selected so that it is nonreactive toward the reactants and catalysts. Solvents such as benzene, toluene and the like are useful.

The novel phosphinyl alicyclic hydrocarbon siloxanes of this invention that are depicted by Formula 2 are produced by the hydrolysis and condensation of the phosphinyl alicyclic hydrocarbon silanes of Formula 1. The novel phosphinyl alicyclic hydrocarbon siloxanes of this invention that contain at least one unit of Formula 2 and at least one unit of Formula 3 are prepared by the cohydrolysis and cocondensation of the phosphinyl alicyclic hydrocarbon silanes of Formula 1 with silanes of the formula:

$$R''_n-Si(OR')_{4-n}$$

where $R'$, $R''$ and $(n)$ have the above-defined meanings.

The ethylenically unsaturated alicyclic silanes employed in the production of the compositions of this invention are mono-, di- and trifunctional with respect to the silicon atom. Ethylenically unsaturated alicyclic silanes which are monofunctional insofar as the silicon atom is concerned are, for example, cyclohexenyldimethylethoxysilane, cyclohexenyldiethylpropoxysilane, cycloheptenyldiphenylethoxysilane and the like. Those which are difunctional insofar as the silicon atom is concerned are, for example, phenyl(cyclohexenyl)diethoxysilane, methyl(cycloheptenyl)dipropoxysilane, cyclohexenyl(ethyl)dimethoxysilane, bicycloheptenyl(methyl)diethoxysilane and the like. Those which are trifunctional insofar as the silicon atom is concerned are, for example, cyclohexenyltriethoxysilane, bicycloheptenyltripropoxysilane and the like.

The organophosphorus compounds employed as starting materials are the phosphonates. Illustrative of the phosphonates useful in the preparation of the compositions of this invention are, diphenylphosphonate $$[(C_6H_5O)_2P(O)H]$$

dixylylphosphonate $[((CH_3)_2C_6H_3O)_2P(O)H]$ and the like. The use of "(O)" in the formulas herein designates oxygen which is bonded to only phosphorus, e.g. P=O, and no differentiation is being made herein between →O (or semipolar linkage) and =O (or double-bond linkage). In many instances, the phosphonates exist in the tautomeric form as the diesters of phosphorous acid, e.g. $(RO)_2POH$ where R has the above-defined meaning. In these instances such diesters are equivalent to the phosphonates and are used in place of said phosphonates in the process of this invention. Such diesters of phosphorous acid, are for example, dimethyl hydrogen phosphite $[(CH_3O)_2POH]$, diphenyl hydrogen phosphite $[(C_6H_5O)_2POH]$, di-2-ethylhexyl hydrogen phosphite $[(C_8H_{17}O)_2POH]$ and the like. The nomenclature employed herein to designate phosphorus compounds is in accordance with the rules for naming compounds containing one phosphorus atom as approved by the general nomenclature committee of the Organic Division of the American Chemical Society and as published in Chemical and Engineering News, volume 30, Number 43, pages 4515 through 4522 (October 27, 1952).

The phosphinyl alicyclic silanes of this invention are useful as lubricants and lubricant additives for improving the lubricity and flame resistance of known lubricants.

The following examples serve to further illustrate my invention and are not to be construed as limitations thereon.

*Example I*

A reaction flask was charged with dimethyl phosphonate $(CH_3O)_2P(O)H$, (30.8 grams, 0.29 mole) and heated to 140° C. A dropping funnel was charged with 3-cyclohexenyltriethoxysilane (68.3 grams, 0.28 mole) and 8 grams of ditertiary butyl peroxide. The dropping funnel was inserted into a reaction flask so that the tip of the funnel was below the surface of the dimethyl phosphonate. The cyclohexenyltriethoxysilane peroxide mixture was then added slowly over a 40 minute period. The reaction mixture was then refluxed for four hours during which time the pot temperature dropped to 137° C. The reaction mixture was then heated to 196° C. under vacuum (5 mm. Hg) to remove the volatile components. The residue was identified as dimethoxyphosphinylcyclohexyltriethoxysilane by infrared analysis and was verified by elemental analysis.

Example II

Water (1.35 g.), xylene (17.8 g.) and dimethoxyphosphinylcyclohexyltriethoxysilane (17.8 g.) were charged into a 250 ml. round-bottomed flask fitted with a Dean-Stark trap, reflux condenser, stirrer and thermometer. The mixture was heated to reflux (~140° C.) for 2½ hours during which time a two phase system had formed. An additional 20 g. of xylene was added; however, a homogeneous insoluble solution was not formed. The heating was continued and the low boiling materials (6.0 g., B.P. 79° C.) were distilled into the Dean-Stark trap. Methanol (20 g.) was added to form a homogeneous solution and the solution was then heated under vacuum to remove volatiles until a constant weight was obtained. A pale amber solid was recovered. Elemental analysis of the pale amber solid confirmed it to be dimethoxyphosphinylcyclohexylpolysiloxane represented by the formula:

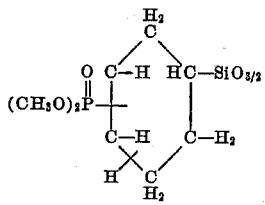

The phosphinyl alicyclic hydrocarbon siloxanes of this invention which contains units of Formula 2 combined with one or more units as depicted by Formula 3 are prepared by the cohydrolysis of the respective silanes according to the process described in Example 2. Thus, for example:

A phosphinyl alicyclic hydrocarbon siloxane containing combined dimethoxyphosphinylcyclohexylmethylsiloxane units and methylvinylsiloxane units can be prepared by the cohydrolysis and cocondensation of dimethoxyphosphinylcyclohexylmethyldiethoxysilane and methylvinyldiethoxysilane.

A phosphinyl alicyclic hydrocarbon siloxane containing combined diphenoxyphosphinylcyclohexylethylsiloxane units and diethylsiloxane units can be prepared by the cohydrolysis and cocondensation of diphenoxyphosphinylcyclohexylethyldimethoxysilane and diethyldiethoxysilane.

A phosphinyl alicyclic hydrocarbon siloxane containing combined di(chlorophenoxy)phosphinylcyclohexylmethylsiloxane units and dimethylsiloxane units can be prepared by the cohydrolysis and cocondensation of di(chlorophenoxy)phosphinylcyclohexylbutylsiloxane and dimethyldiethoxysilane.

What is claimed is:

1. As a new composition of matter an organosilicon compound containing at least one silicon-bonded group represented by the formula:

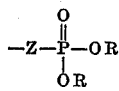

wherein Z is a divalent alicyclic hydrocarbon radical free of aliphatic unsaturation and containing from 5 to 7 carbon atoms, inclusive, and R is a member of the class consisting of monovalent hydrocarbon radicals and halogenated monovalent hydrocarbon radicals, said organosilicon compound is selected from the class consisting of organosilanes wherein at least one valence of silicon being satisfied by the

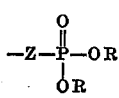

grouping, and at least one valence of silicon is satisfied by a hydrocarbonoxy group free of aliphatic unsaturation, any remaining valences of silicon being satisfied by monovalent hydrocarbon radicals free of aliphatic unsaturation and halogenated monovalent hydrocarbon radicals free of aliphatic unsaturation and organosiloxanes having all its valences of silicon other than the valence of silicon satisfied by said

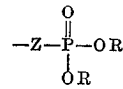

grouping and by siloxane linkages, satisfied by monovalent hydrocarbon radicals free of aliphatic unsaturation and halogenated monovalent hydrocarbon radicals free of aliphatic unsaturation.

2. As a new composition of matter a phosphinyl alicyclic hydrocarbon silane having the general formula:

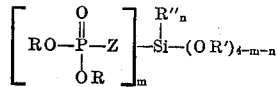

wherein R is a member selected from the class consisting of monovalent hydrocarbon radicals and monovalent hydrocarbon radicals which are substituted with halogen, R' is a monovalent hydrocarbon radical, R" is a monovalent hydrocarbon radical free of aliphatic unsaturation, Z is a divalent alicyclic hydrocarbon radical of from 5 to 7 carbon atoms and free of aliphatic unsaturation, ($m$) is an integer of from 1 to 3, inclusive, and ($n$) is an integer of from 0 to 2, inclusive, the sum of $m+n$ not exceeding 3.

3. As a new composition of matter a phosphinyl alicyclic hydrocarbon siloxane containing at least one unit of the formula:

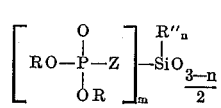

wherein R is a member selected from the class consisting of monovalent hydrocarbon radicals and monovalent hydrocarbon radicals which are substituted with halogen, R" is a monovalent hydrocarbon radical free of aliphatic unsaturation, Z is a divalent alicyclic hydrocarbon radical of from 5 to 7 carbon atoms, inclusive and free of aliphatic unsaturation, ($m$) is an integer of from 1 to 3, inclusive, and ($n$) is an integer of from 0 to 2, inclusive, the sum of $m+n$ not exceeding 3.

4. As a new composition of matter a phosphinyl alicyclic hydrocarbon siloxane containing at least one unit of the formula:

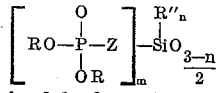

and at least one unit of the formula:

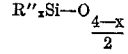

wherein R is a member selected from the class consisting of monovalent hydrocarbon radicals and monovalent hydrocarbon radicals which are substituted with halogen, R" is a monovalent hydrocarbon radical free of aliphatic unsaturation, Z is a divalent alicyclic hydrocarbon radical of from 5 to 7 carbon atoms, inclusive and free of aliphatic unsaturation, ($m$) is an integer of from 1 to 3, inclusive, ($n$) is an integer of from 0 to 2, inclusive, the sum of $m+n$ not exceeding 3 and ($x$) is an integer of from 0 to 3, inclusive.

5. As a new composition of matter dimethoxyphosphinylcyclohexyltriethoxysilane.

6. As a new composition of matter dimethoxyphosphinylcyclohexylpolysiloxane.

References Cited in the file of this patent

UNITED STATES PATENTS

| | | |
|---|---|---|
| 2,727,067 | Craig et al. | Dec. 13, 1955 |
| 2,843,615 | Linville | July 15, 1958 |
| 2,889,349 | Garden et al. | June 2, 1959 |

UNITED STATES PATENT OFFICE
CERTIFICATE OF CORRECTION

Patent No. 2,996,530                      August 15, 1962

Frank Fekete

It is hereby certified that error appears in the above numbered patent requiring correction and that the said Letters Patent should read as corrected below.

Column 6, lines 32 to 35, and line 48 to 51, the left hand portion of each formula should appear as shown below instead of as in the patent:

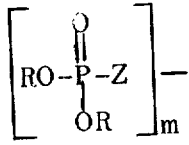

Signed and sealed this 30th day of October 1962.

(SEAL)
Attest:

ERNEST W. SWIDER
Attesting Officer

DAVID L. LADD
Commissioner of Patents